United States Patent
Nesse et al.

(10) Patent No.: US 8,412,922 B2
(45) Date of Patent: *Apr. 2, 2013

(54) ON-SITE CONFIGURATION OF A HARDWARE DEVICE MODULE OF A SECURITY SYSTEM

(75) Inventors: Ted Nesse, Stillwater, MN (US); Jim Stevens, Mahtomedi, MN (US)

(73) Assignee: Sercomm Corporation, Taipei (TW)

( * ) Notice: Subject to any disclaimer, the term of this patent is extended or adjusted under 35 U.S.C. 154(b) by 1367 days.

This patent is subject to a terminal disclaimer.

(21) Appl. No.: 11/923,385

(22) Filed: Oct. 24, 2007

(65) Prior Publication Data

US 2009/0113193 A1    Apr. 30, 2009

(51) Int. Cl.
*G06F 9/00*    (2006.01)
(52) U.S. Cl. .................................. 713/100; 709/220
(58) Field of Classification Search .................. 713/100; 709/220
See application file for complete search history.

(56) References Cited

U.S. PATENT DOCUMENTS

| | | | |
|---|---|---|---|
| 4,466,063 A | | 8/1984 | Segarra et al. |
| 5,256,863 A | | 10/1993 | Ferguson et al. |
| 5,257,007 A | * | 10/1993 | Steil et al. .................. 340/539.3 |
| 5,715,453 A | | 2/1998 | Stewart |
| 5,781,902 A | * | 7/1998 | Waszkiewicz .......................... 1/1 |
| 5,838,907 A | | 11/1998 | Hansen |
| 5,897,635 A | | 4/1999 | Torres et al. |
| 5,980,078 A | * | 11/1999 | Krivoshein et al. ................ 700/1 |
| 6,098,098 A | | 8/2000 | Sandahl et al. |
| 6,141,681 A | | 10/2000 | Kyle |
| 6,286,038 B1 | | 9/2001 | Reichmeyer et al. |
| 6,360,262 B1 | | 3/2002 | Guenthner et al. |
| 6,378,069 B1 | * | 4/2002 | Sandler et al. ................ 713/153 |
| 6,400,958 B1 | | 6/2002 | Isomursu et al. |
| 6,560,659 B1 | * | 5/2003 | Tobias et al. ...................... 710/8 |
| 6,772,204 B1 | * | 8/2004 | Hansen ......................... 709/220 |
| 6,826,581 B2 | * | 11/2004 | Moslander et al. .................... 1/1 |
| 7,047,088 B2 | | 5/2006 | Nakamura et al. |
| 7,206,651 B2 | * | 4/2007 | Takemura et al. .............. 700/94 |
| 7,234,115 B1 | | 6/2007 | Sprauve et al. |
| 7,237,102 B2 | * | 6/2007 | Rothman .......................... 713/1 |
| 7,330,109 B2 | * | 2/2008 | Martin .......................... 340/506 |
| 2001/0037389 A1 | | 11/2001 | Fujimori et al. |
| 2002/0023188 A1 | * | 2/2002 | Heidel et al. .................. 710/305 |
| 2003/0163289 A1 | * | 8/2003 | Whelan et al. ................ 702/188 |
| 2004/0021678 A1 | * | 2/2004 | Ullah et al. .................... 345/700 |
| 2004/0095237 A1 | | 5/2004 | Chen et al. |
| 2005/0004559 A1 | * | 1/2005 | Quick et al. ...................... 606/1 |
| 2005/0022183 A1 | * | 1/2005 | Poisson et al. .................... 718/1 |
| 2005/0033477 A1 | * | 2/2005 | Friedman ..................... 700/264 |

(Continued)

OTHER PUBLICATIONS

Co-pending U.S. Appl. No. 11/923,954, filed Oct. 25, 2007.

(Continued)

*Primary Examiner* — Kim Huynh
*Assistant Examiner* — Zahid Choudhury
(74) *Attorney, Agent, or Firm* — Hamre, Schumann, Mueller & Larson, P.C.

(57) ABSTRACT

A security system is provided. The security system comprises a plurality of hardware device modules and a plurality of sensor detection devices. At least one of the hardware device modules has a microcontroller coupled to a memory element that stores a configuration map for on-site configuration comprising configuration option information available for the at least one hardware device module. The plurality of sensor detection devices are capable of sending at least a signal to one or more of the hardware device modules.

22 Claims, 4 Drawing Sheets

U.S. PATENT DOCUMENTS

| | | | |
|---|---|---|---|
| 2005/0055716 A1 | 3/2005 | Louie et al. | |
| 2005/0060562 A1* | 3/2005 | Bhattacharya et al. | 713/200 |
| 2005/0149639 A1 | 7/2005 | Vrielink et al. | |
| 2005/0172258 A1* | 8/2005 | Nixon et al. | 717/100 |
| 2005/0192847 A1* | 9/2005 | Satheesan et al. | 705/3 |
| 2006/0092011 A1* | 5/2006 | Simon et al. | 340/521 |
| 2006/0125632 A1 | 6/2006 | Luebke et al. | |
| 2006/0168322 A1* | 7/2006 | Gray et al. | 709/238 |
| 2006/0184350 A1* | 8/2006 | Huang et al. | 703/26 |
| 2006/0232295 A1* | 10/2006 | Agrawal et al. | 326/38 |
| 2007/0113186 A1 | 5/2007 | Coles et al. | |
| 2007/0195711 A1* | 8/2007 | Morris et al. | 370/254 |
| 2008/0061923 A1* | 3/2008 | Simon et al. | 340/3.1 |
| 2008/0072314 A1* | 3/2008 | Frenette | 726/19 |
| 2008/0316024 A1* | 12/2008 | Chantelou et al. | 340/539.17 |

OTHER PUBLICATIONS

International Search Report of PCT/US2008/079084, dated Apr. 28, 2009.

Written Opinion of the International Searching Authority of PCT/US2008/079084, dated Apr. 28, 2009.

International Search Report of PCT/US2008/079077, dated Apr. 24, 2009, 3 pages.

Written Opinion of the International Searching Authority of PCT/US2008/079077, dated Apr. 24, 2009, 4 pages.

\* cited by examiner

ON-SITE CONFIGURATION OF A HARDWARE DEVICE MODULE OF A SECURITY SYSTEM

FIELD

This disclosure relates generally to the field of security systems. More particularly, the disclosure relates to systems and methods for on-site configuration of a configurable hardware device module of a security system.

BACKGROUND

On-site configuration of a security system is known. Typically, configuration of the multiple devices in a security system is achieved by the user interface device of the security system or a tool that is directly coupled to the security system. The user interface device is preprogrammed with a configuration utility that has a preset option list for each device to configure that device with the security system. In these security systems, the programming options are limited to the preset option list hard coded into the user interface device. Accordingly, it becomes difficult for the security system to stay compatible with new devices or support existing devices with enhanced functionality.

For the reasons stated above, and for other reasons stated below that will become apparent to those skilled in the art upon reading and understanding the present specification, there is a need in the art for improved systems and methods for on-site configuration of a configurable hardware device module of a security system.

SUMMARY

This disclosure relates to improved systems and methods for on-site configuration of a configurable hardware device module of a security system. These systems and methods would allow an on-site configuration tool of a security system to stay compatible with other new device modules that may be added to the system, or to existing device modules that are modified with enhanced functionality. In particular, the configurable hardware device module has a configuration map comprising configuration option information available for the configurable hardware device module that can be transferred to an on-site configuration tool for generating a dynamic user interface to configure the configurable hardware device module.

In one embodiment, a security system is provided. The security system comprises a plurality of hardware device modules and a plurality of sensor detection devices. At least one of the hardware device modules has a microcontroller coupled to a memory element that stores a configuration map for on-site configuration comprising configuration option information available for the at least one hardware device module. The plurality of sensor detection devices are capable of sending at least a signal to one or more of the hardware device modules.

In another embodiment, a configurable hardware device module usable in a security system is provided. The configurable hardware device module comprises a microcontroller and a memory element coupled to the microcontroller. The memory element stores a configuration map for on-site configuration comprising configuration option information available for the configurable hardware device module.

In another embodiment, on-site configuration tool usable in a security system is provided. The on-site configuration tool comprises a microcontroller and a memory element coupled to the microcontroller. The memory element stores a configuration engine that is capable of generating a dynamic user interface based on a configuration map received from a configurable hardware device module.

In yet another embodiment, a method of on-site configuration of a configurable hardware device module of a security system is provided. The method comprises providing a configurable hardware device module having a configuration map and directly coupling an on-site configuration tool having a configuration engine, a display and a user input device to the security system. The method also includes transferring the configuration map from the configurable hardware device module to the on-site configuration tool and generating a dynamic user interface specifically tailored to the configurable hardware device module using the configuration engine in the on-site configuration tool and the configuration map transferred into the on-site configuration tool from the configurable hardware device module.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice what is claimed, and it is to be understood that other embodiments may be utilized and that logical, mechanical and electrical changes may be made without departing from the spirit and scope of the claims. The following detailed description is, therefore, not to be taken in a limiting sense.

Embodiments presented herein involve systems and methods for on-site configuration of a configurable hardware device module of a security system. As described herein, on-site configuration means that an on-site configuration tool is to be directly coupled via a direct wired connection or a direct wireless connection to the configurable hardware device module being programmed on the premises being secured. Advantageously, these embodiments provide an on-site configuration tool for a security system that remains compatible with other new configurable hardware device modules that may be added to the security system, or to existing configurable hardware device modules that are modified with enhanced functionality. In the embodiments described below, the on-site configuration tool is described as a user interface module. However, in other embodiments, the on-site configuration tool can be a separate device from the security system.

Figure 1:
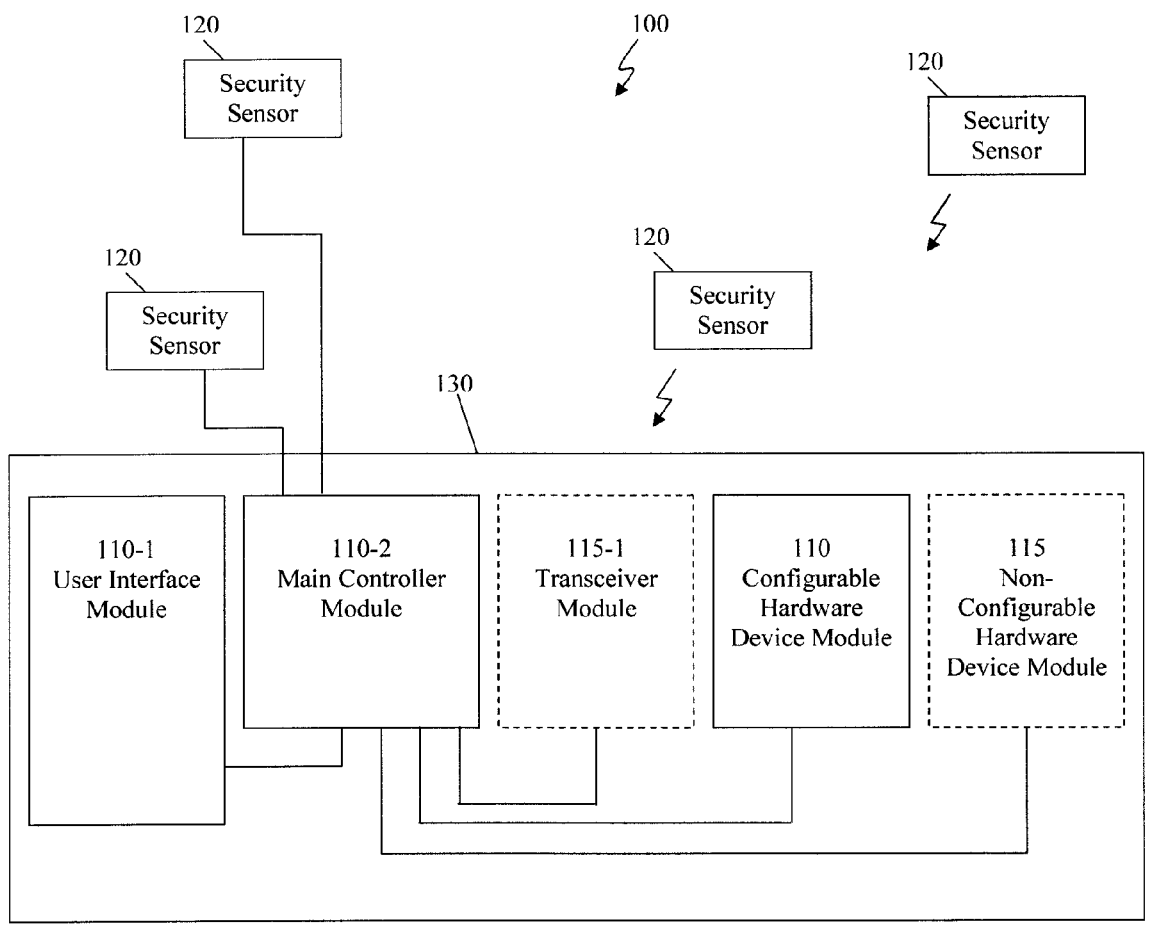
FIG. 1 is a block diagram of a security system according to one embodiment.

FIG. 1 is a block diagram of a security system 100 according to one embodiment. Security system 100 comprises a plurality of configurable hardware device module modules 110, including a user interface module 110-1 and a main controller module 110-2, a plurality of non-configurable modules 115, including a non-configurable transceiver module 115-1, and a plurality of security sensor devices 120 that are connected directly to the main controller module 110-2 or wirelessly to the non-configurable transceiver module 115-1. Examples of other configurable hardware device modules 110 include, but are not limited to, a transceiver module (not shown), an additional user interface module (not shown), a hardwired zone expander module (not shown), a cellular communicator module (not shown) and an Ethernet interface module (not shown). In some embodiments, multiple configurable hardware device modules 110 can be configured together. For example, in one embodiment the telephone interface module (not shown) can be configured with the main controller module 110-2. Also, in some embodiments, all of the hardware device modules are configurable. Also, in the described embodiment, every configurable and non-configurable hardware device module 110, 115, except the main controller module 110-2, is directly coupled to the main controller module 110-2. As the main controller module 110-2 is directly coupled to the user interface module 110-1, every configurable and non-configurable hardware device module 110, 115, except the user interface module 110-1, is thereby also directly coupled to the user interface module 110-1.

As shown in FIG. 1, the configurable and non-configurable hardware device modules 110, 115 are all enclosed within a housing 130. However, in other embodiments, one or more of the configurable and non-configurable hardware device modules 110, 115 can be located outside of the housing 130 within a different housing and the configurable and non-configurable hardware device modules 110, 115 interact with the user interface module 110-1 via wireless communication. Since the configurable hardware device modules 110 of the security system 100 are modular, a new configurable hardware device module 110 can be added to the security system 100 and each configurable hardware device module 110 can be replaced with a new configurable hardware device module 110 or can be modified with enhanced functionality at any time.

Examples of security sensor devices 120 include, but are not limited to: a door/window sensor that detects when a portal is opened; a motion detector that detects movement within a space; a smoke detector that detects smoke within an area; a heat detector that detects excessive heat within an area; a low temperature detector that detects a potentially hazardous temperature within an area; a glass break detector which detects a breakage of glass. The security sensor device 120 can also be a device initiated by a user, for example a key fob that allows the user to initiate a communication message by pressing a button on the keyfob.

In one embodiment, the security system 100 generally functions as follows. The security sensor devices 120 are used to send a signal or communication messages that contain status signals of various portions of the premises being monitored by the security system 100. In some embodiments, the sensor device 120 may simply be a switch that is directly connected to the main controller module 110-2 and sends a signal to the main controller module 110-2. In other embodiments, the sensor device 120 sends one or more communication messages through a direct wire connection to the main controller module 110-2. In these embodiments, where the sensor devices 120 are all connected directly to the main controller 110-2, a configurable transceiver module (not shown) or the non-configurable transceiver module 115-1 is not needed. However, in other embodiments, the sensor device 120 sends one or more communication messages wirelessly to a configurable transceiver module (not shown) or the transceiver module 115-1. In the embodiment of FIG. 1, the transceiver module 115-1 receives one or more of the communications message and stores them in the main controller module 110-2. The main controller module 110-2 parses the received communication message and determines the appropriate action to be taken by the security system 100 and prepares and sends instruction signals to the appropriate hardware device modules 110, 115. Depending on the instruction signals sent by the main controller module 110-2, the various hardware device modules 110, 115 then perform the appropriate actions required by the instruction signals. For example, in the case of an emergency, an instruction signal can be sent to a telephone interface module that instructs the telephone interface module to transmit an event communication notifying a central station, located outside of the premises being secured, of an emergency and the need for police, fire or ambulance assistance.

Figure 2:
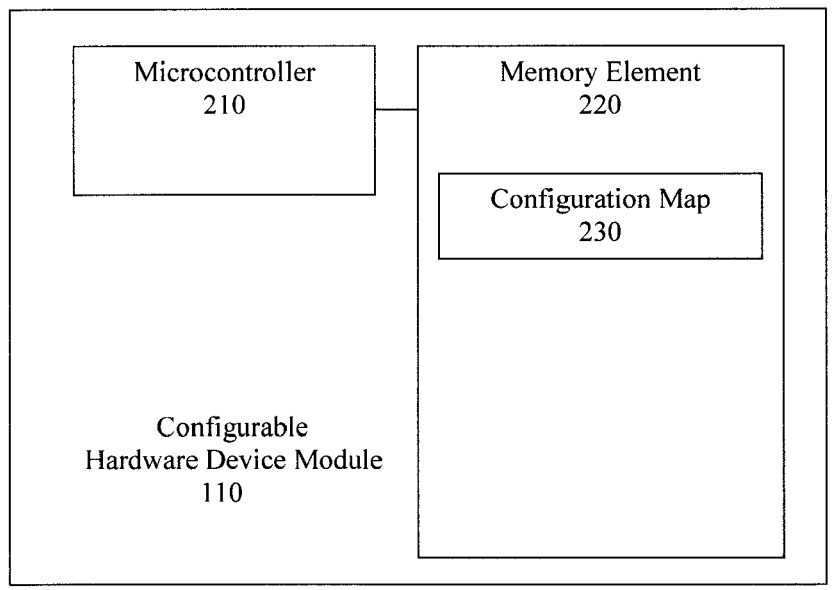
FIG. 2 is a block diagram of a configurable hardware device module according to one embodiment.

FIG. 2 is a block diagram of a configurable hardware device module 110 according to one embodiment. Each configurable hardware device module 110 includes at least a microcontroller 210 coupled to a memory element 220. Depending on its particular functionality, each configurable hardware device module 110 will also include other components (not shown) to perform their various functions. The memory element of each configurable hardware device module 110 stores a configuration map 230 that contains the types of configuration options available for programming the configurable hardware device module 110. The configuration map 230 is stored in the same format in every memory element 220 of every configurable hardware device module 110, but the configuration options available and stored onto the configuration map 230 may vary depending on the functionality of the configurable hardware device module 110.

Figure 3A:
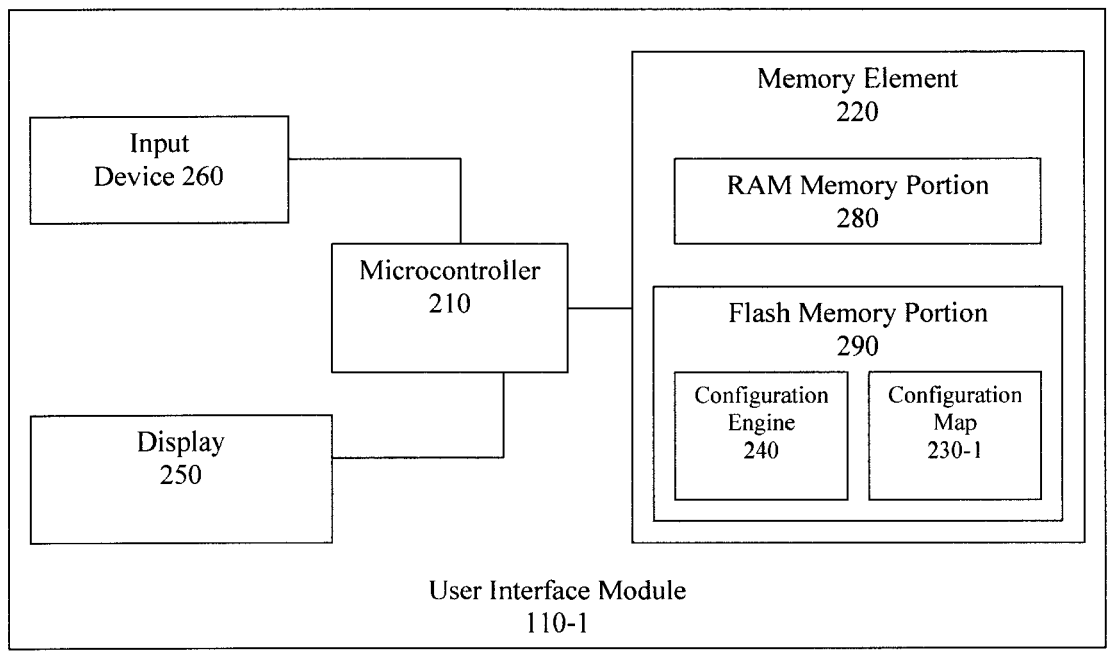
FIG. 3A is a block diagram of a modular user interface device prior to creating a dynamic user interface according to one embodiment.
Figure 3B:
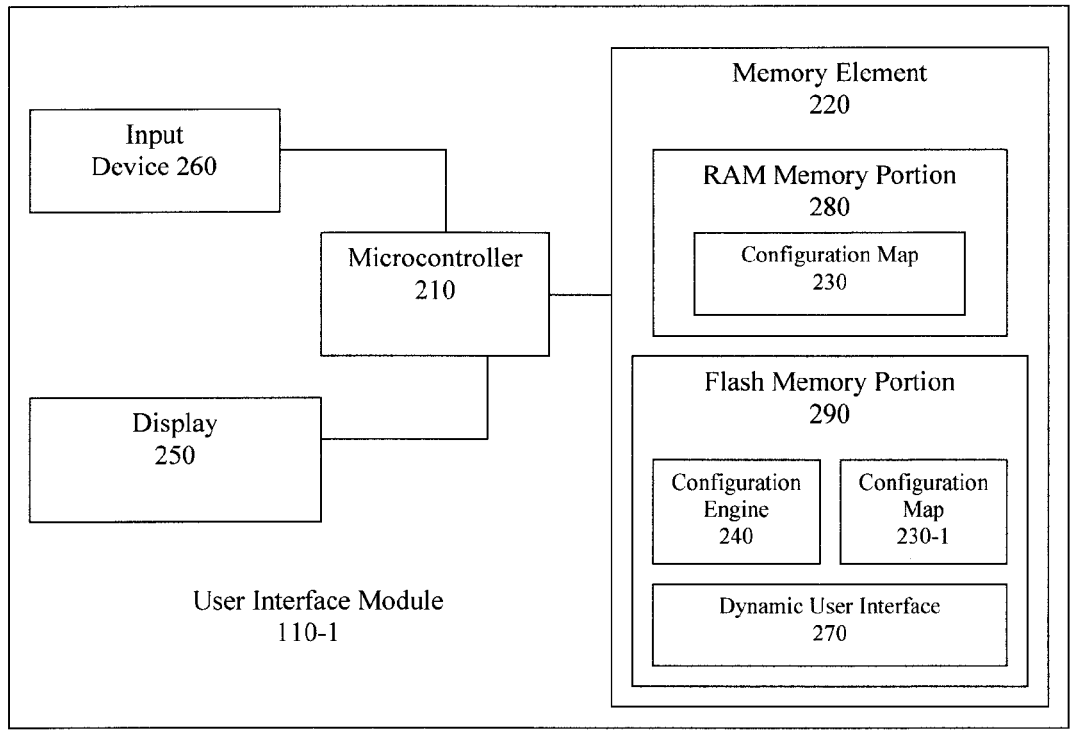
FIG. 3B is a block diagram of a modular user interface device after creating a dynamic user interface according to one embodiment.
Figure 3C:
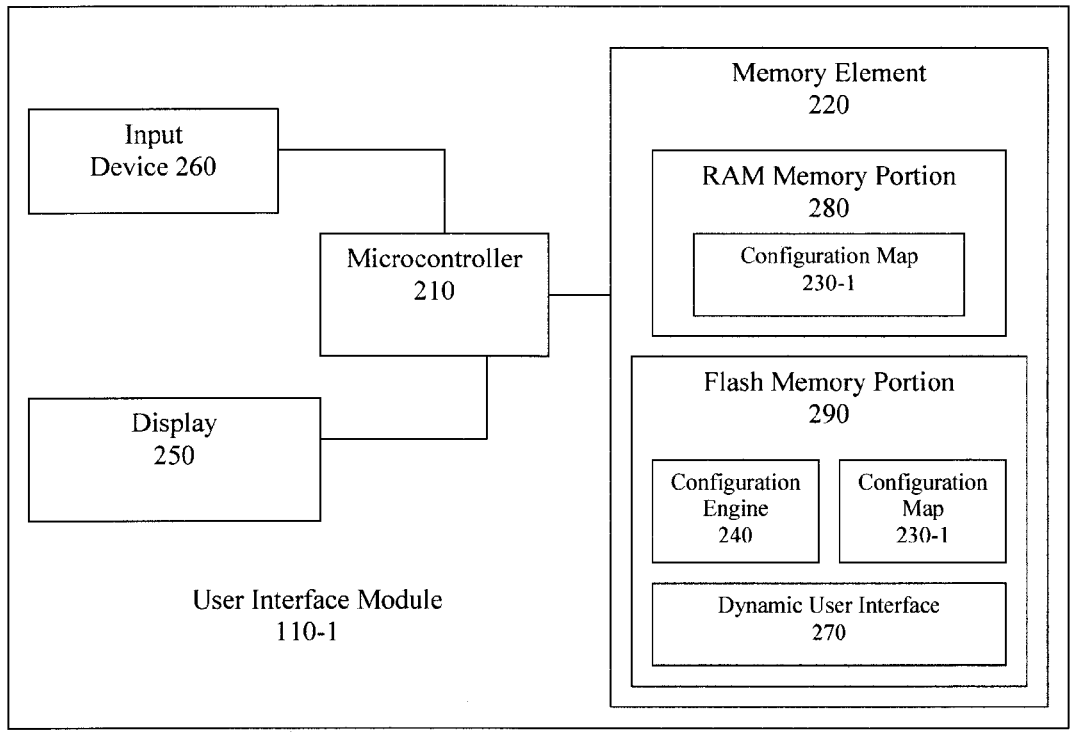
FIG. 3C is a block diagram of the modular user interface module after creating a dynamic user interface for the user interface module according to one embodiment.

FIG. 3A is a block diagram of the modular user interface module 110-1 prior to creating a dynamic user interface according to one embodiment. FIG. 3B is a block diagram of the modular user interface module 110-1 after creating the dynamic user interface for a configurable hardware device module according to one embodiment. FIG. 3C is a block diagram of the modular user interface module 110-1 after creating a dynamic user interface for the user interface module 110-1 according to one embodiment. The user interface module 110-1 is coupled to the plurality of configurable hardware device modules 110, as shown in FIG. 1. Similar to the other configurable hardware device modules 110, shown in FIG. 2, the modular user interface module 110-1 stores a configuration map 230 for the configurable hardware device module 110 to be configured in a random access memory (RAM) portion 280 of the memory element 220. A configuration map 230-1 of the user interface module 110-1 is stored in a flash memory portion 290 of the memory element 220. The user interface module 110-1 also includes a configuration engine 240, a display 250 coupled to the microcontroller 210 and an input device 260 coupled to the microcontroller 210. In one embodiment, the display 250 is an LCD display and the input device 260 is a tactile keypad.

As shown in FIG. 3B, upon user request, the configuration map 230 from one of the configurable hardware device modules 110 is transferred from the configurable hardware device module 110 being programmed to the memory element 220 of the user interface module 110-1. The microcontroller 210 of the user interface module 110-1 uses the configuration engine 240 stored in the memory element 220 and the information stored in the configuration map 230 that was transferred from the configurable hardware device module 110 to be programmed and creates a dynamic user interface 270. As shown in FIG. 3C, when the user interface module 110-1 is being configured, the configuration map 230 of the user interface module 110-1 is transferred in portions to the RAM portion of the memory element 220 as needed by the configuration engine 240 to create the dynamic user interface 270. In other embodiments, when the user interface module 110-1 is being configured, the configuration map 230 of the user interface module 110-1 is transferred in its entirety to the RAM portion 280 prior to the configuration engine 240 creating the dynamic user interface 270.

The dynamic user interface 270 is stored in the memory element 220 of the user interface module 110-1 and is specifically tailored with the programming options available for programming the configurable hardware device module 110. The microcontroller 210 sends the dynamic user interface 270 to the display 250 and allows the programming user to program configuration options made available by the configuration map 230 transferred from the configurable hardware device module 110 being programmed via the input device 260. The user can then configure the configurable hardware device module 110 using the input device 260 on the user interface module 110-1 to navigate through the various menus created in the user interface module 110-1. As the user interface module 110-1 is coupled to the configurable hardware device module 110, the options chosen by the user can be programmed onto the microcontroller 210 of the hardware device being programmed.

Figure 4:
FIG. 4 is an illustrative representation of a configuration map stored in the configurable hardware device module according to one embodiment.

FIG. 4 is an illustrative representation of the configuration map 230 according to one embodiment. In this embodiment, the configuration map 230 is encoded using an ASCII (American Standard Code for Information Interchange) format. In other embodiments, the configuration map 230 is encoded using other formats, for example, a binary, hexadecimal or decimal format. The configuration map 230 includes one or more configurable options 405 used for configuring the configurable hardware device module 110 to the system 100. For each configurable option 405 available to the particular configurable hardware device module 110, the configuration map 230 includes a plurality of fields 410. Each field 410 is represented by an ASCII character used by the configuration engine 240 to identify the particular field 410. Following the ASCII character, the configuration map includes either an ASCII digit(s) for the value of the field, or an ASCII string delimited with quotation marks.

The field 410-M describes the required identification of the predefined top level menu under which the configurable option 405 is placed on the display 250. Namely, the field 410-M designates which preset top level menu the configurable option 405 is placed under on the display 250. The field 410-M is also able to designate a new top level menu for the configurable option 405 if defined by the configurable hardware device module 110.

The field 410-I describes the required numeric identification of the configurable option 405 for display to the user. Namely, the field 410-I designates the displayed position on the display 250 of the configurable option 405 under the designated top level menu defined in the field 410-M.

The field 410-T describes the required data type to define the required validation of the user's input into the input device 260. Namely, the field 410-T designates the type of data required by the user to be inputted using the input device 260 for the particular configurable option 405. Data types that can be used include, for example, ASCII characters, decimal characters or dot-decimal characters. The field 410-S describes the required size of the data type inputted in bytes. Namely, the field 410-S designates the required size to be inputted by the user into the input device 260 for the configurable option 405. However, in some embodiments, this field is omitted for Boolean data types as they only occupy ⅛ of a byte and are therefore required to be stored differently.

The field 410-C describes an optional count of items that consist of multiple identical entries. Namely, the field 410-C designates an index number to distinguish between two or more identical configurable options 405.

The field 410-G describes an optional index for denoting configurable options 405 that must be grouped together. Namely, the field 410-G designates two or more configurable options 405 that should be grouped together on the display 250.

The field 410-N describes an optional minimum value for numeric configurable options 405. Namely, the field 410-N designates the minimum number of options available for the user to input into the input device 260 for the configurable option 405.

The field 410-X describes an optional maximum value for numeric configurable options 405. Namely, the field 410-X designates the maximum number of options available for the user to input into the input device 260 for the configurable option 405.

The field 410-V describes an optional input validator selector for setting validation rules on the type of valid inputs that can be inputted by the user into the input device 260. Namely, the field 410-V validates that the entry input by the user into the input device 260 is a valid entry. Possible valid inputs include, for example, lower case characters, ASCII digits, or the like.

The field 410-D describes an optional value that will indicate that the configurable option 405 is disabled. Namely, the field 410-D designates the value that the configuration engine can store for the option that will turn off or disable the feature.

The field 410-A describes the required code indicating the type of programming access to provide for the configurable option 405. Namely, the field 410-A designates the type of user that is allowed access to change the configurable option 405. In one embodiment, there are three types of access available for the configurable option 405. The first type of access is no access, whereby the configurable option 405 is only installed and programmed during the manufacturing of the configurable hardware device module 110. The second type of access is installer access, whereby only a user with authorization is allowed to program the configurable option 405. The last type of access is users and installers access, whereby all users can program the configurable option 405.

The field 410-P describes the required text prompt for the user. Namely, the field 410-P designates the name of the configurable option 405 shown on the display 250.

Examples of several configurable options of a configuration map, including, for example, the account identifier, the communication method and the phone number identifier, according to one embodiment are listed below.

M1I1T0S3C4G1N000000XFFFFFFA1W1P\"account\"\
M1I12T1S1C4G1X4A1W1P\"comm method\"\
M1I3T0S13C4G1V9A1W1P\"phone number\"\

What is claimed is:

1. A security system, the system comprising:
   a plurality of hardware device modules, at least one of which having a microcontroller coupled to a memory element that stores a configuration map for on-site configuration encoded with configuration option information available for the at least one hardware device module;
   a plurality of security sensor detection devices, wherein each of the plurality of security sensor detection devices is configured to monitor a premises and is capable of sending a status signal to one or more of the hardware device modules; and
   an on-site configuration tool that includes a configuration engine, wherein the on-site configuration tool is coupled to the at least one hardware device module and is configured to receive the configuration map from the at least one hardware device module, and generate a dynamic user interface to configure the at least one hardware device module based on the received configuration map using the configuration engine;
   wherein the plurality of hardware device modules includes a main controller module configured to receive the status signal from one of the plurality of security sensor detection devices and send an instruction signal to one of the plurality of hardware device modules based on the status signal.

2. The security system of claim 1, wherein the on-site configuration tool is a user interface module.

3. The security system of claim 2, wherein the user interface module includes a display that displays the dynamic user interface and a user input device that is used to configure options provided in the dynamic user interface.

4. The security system of claim 1, wherein the configuration map is encoded using an ASCII format.

5. The security system of claim 1, wherein the configuration option information includes a plurality of configurable options, each configurable option including a plurality of fields represented by a field identifier and either a value of the field or a string.

6. The security system of claim 5, wherein the configuration option information in the configuration map includes: a menu identification field, a menu index identification field, an input data type field, a multiple entry index field, a grouping index field, a minimum user input value field, a maximum user input value field, an input validator selector field, a value used to disable a feature field, a user access index field and a text prompt field.

7. The security system of claim 1, wherein the configuration map is encoded in a binary, hexadecimal, or decimal format.

8. The security system of claim 1, wherein the plurality of security sensor detection devices includes one of: a door/window sensor; a motion detector sensor; a smoke detector sensor; a heat detector sensor; a low temperature detector sensor; a glass break detector sensor; or a key fob.

9. The security system of claim 1, wherein each configurable option of the configuration map includes an input data size field.

10. The security system of claim 1, further comprising a housing enclosing one of the plurality of hardware device modules and the on-site configuration tool;
    wherein one of the plurality of security sensor detection devices and one of the plurality of hardware device modules are located outside of the housing; and
    wherein one of the plurality of hardware device modules interacts with the on-site configuration tool via wireless communication.

11. A configurable hardware device module usable in a security system, the configurable hardware device module comprising:
    a microcontroller; and
    a memory element coupled to the microcontroller;
    a configuration map stored in the memory element for on-site configuration;
    wherein the configurable hardware device module is configured to send the configuration map encoded with configuration option information to an on-site configuration tool for programming the configurable hardware device module; and
    wherein the configuration option information includes a plurality of configurable options, each configurable option including a plurality of fields represented by a field identifier and either a value of the field or a string.

12. The configurable hardware device module of claim 11, wherein the configuration map is encoded using an ASCII format.

13. The configurable hardware device module of claim 11, wherein each configurable option of the configuration map includes: a menu identification field, a menu index identification field, an input data type field, a multiple entry index field, a grouping index field, a minimum user input value field, a maximum user input value field, an input validator selector field, a value used to disable a feature field, a user access index field and a text prompt field.

14. An on-site configuration tool usable in a security system, the on-site configuration tool comprising:
    a microcontroller; and
    a memory element coupled to the microcontroller;
    a configuration engine stored in the memory element that is configured to generate a dynamic user interface based on a configuration map received from a configurable hardware device module; and
    wherein the configuration engine is configured to decode the received configuration map encoded with configuration option information that includes a plurality of configurable options, each configurable option including a plurality of fields represented by a field identifier and either a value of the field or a string.

15. The on-site configuration tool of claim 14, wherein a user interface module is the on-site configuration tool.

16. The on-site configuration tool of claim 15, wherein a configuration map stored in the memory element comprising configuration option information for programming the user interface module.

17. The on-site configuration tool of claim 14, further comprising a display coupled to the microcontroller that is configured to display the dynamic user interface and a user input device coupled to the microcontroller that is configured to configure options provided in the dynamic user interface.

18. The on-site configuration tool of claim 14, wherein the memory element includes a random access memory Portion for storing a configuration map for the on-site configuration tool and a flash memory portion for storing the configuration engine, the received configuration map and the dynamic user interface.

19. A method of on-site configuration of a configurable hardware device module of a security system, the method comprising:
    providing a configurable hardware device module having a configuration map encoded with configuration option information that includes a plurality of configurable options, each configurable option including a plurality of fields represented by a field identifier and either a value of the field or a string;

directly coupling an on-site configuration tool having a configuration engine, a display and a user input device to the security system;

transferring the configuration map from the configurable hardware device module to the on-site configuration tool;

generating a dynamic user interface specifically tailored to the configurable hardware device module using the configuration engine in the on-site configuration tool and the configuration map transferred into the on-site configuration tool from the configurable hardware device module.

20. The method of claim 19, wherein the on-site configuration tool is a user interface module.

21. The method of claim 19, further comprising:

including for each configurable option in the configuration map: a menu identification field, a menu index identification field, an input data type field, a multiple entry index field, a grouping index field, a minimum user input value field, a maximum user input value field, an input validator selector field, a value used to disable a feature field, a user access index field and a text prompt field.

22. The method of claim 19, wherein the configuration map is encoded in an ASCII format.

* * * * *